US009932494B2

(12) United States Patent
Choi et al.

(10) Patent No.: US 9,932,494 B2
(45) Date of Patent: Apr. 3, 2018

(54) CARBON NANOMATERIAL-CONTAINING RESIN COMPOSITION AND MOLDED PLASTIC PRODUCT

(71) Applicant: LG CHEM, LTD., Seoul (KR)

(72) Inventors: Yeon Sik Choi, Daejeon (KR); Su Min Lee, Daejeon (KR); Chang Hun Yun, Daejeon (KR); Gi Dae Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/424,356

(22) PCT Filed: Aug. 28, 2014

(86) PCT No.: PCT/KR2014/008020
§ 371 (c)(1),
(2) Date: Feb. 26, 2015

(87) PCT Pub. No.: WO2015/030501
PCT Pub. Date: Mar. 5, 2015

(65) Prior Publication Data
US 2016/0032144 A1    Feb. 4, 2016

(30) Foreign Application Priority Data

Sep. 2, 2013 (KR) .................. 10-2013-0104595

(51) Int. Cl.
| C08K 5/19 | (2006.01) |
| C08K 3/04 | (2006.01) |
| C09D 177/06 | (2006.01) |
| C08K 5/01 | (2006.01) |
| C08K 5/09 | (2006.01) |
| C08K 7/06 | (2006.01) |
| C08K 7/24 | (2006.01) |
| C08J 3/205 | (2006.01) |
| C08J 5/00 | (2006.01) |
| C08K 7/14 | (2006.01) |

(52) U.S. Cl.
CPC .......... *C09D 177/06* (2013.01); *C08J 3/2053* (2013.01); *C08J 5/005* (2013.01); *C08K 3/04* (2013.01); *C08K 5/01* (2013.01); *C08K 5/09* (2013.01); *C08K 7/06* (2013.01); *C08K 7/14* (2013.01); *C08K 7/24* (2013.01); *C08J 2300/22* (2013.01); *C08J 2377/00* (2013.01); *C08K 2201/011* (2013.01)

(58) Field of Classification Search
CPC ...... C08K 5/01; C08K 7/14; C08K 2201/001; C08L 2666/55; C08L 2666/86
USPC ....................................................... 524/495
See application file for complete search history.

(56) References Cited

U.S. PATENT DOCUMENTS

| 5,445,327 | A * | 8/1995 | Creehan | ........ B29C 67/246 241/22 |
| 2004/0016912 | A1* | 1/2004 | Bandyopadhyay | ...... C08K 3/04 252/500 |
| 2010/0038597 | A1* | 2/2010 | Reynolds | ........ C09D 5/24 252/500 |
| 2010/0279095 | A1* | 11/2010 | Li | ........ B82Y 30/00 428/220 |
| 2011/0021651 | A1* | 1/2011 | Mayeres | ........ C08J 9/0038 521/79 |
| 2012/0104329 | A1* | 5/2012 | Meyer | ........ C08F 293/005 252/511 |
| 2013/0187084 | A1 | 7/2013 | Yoon et al. | |
| 2013/0274091 | A1* | 10/2013 | Maparu | ........ B01J 27/232 502/167 |
| 2013/0309423 | A1* | 11/2013 | Roger | ........ H01B 1/04 428/1.4 |
| 2014/0154552 | A1* | 6/2014 | Hong | ........ H01M 4/5825 429/144 |
| 2014/0377160 | A1* | 12/2014 | Mukasyan | ........ C01B 31/0446 423/448 |

FOREIGN PATENT DOCUMENTS

| CN | 1802712 A | 7/2006 |
| CN | 102348731 A | 2/2012 |
| EP | 2868690 A1 | 5/2015 |
| KR | 1020070102266 | 10/2007 |
| KR | 1020090090738 | 8/2009 |
| KR | 1020090095766 | 9/2009 |
| KR | 1020110125529 | 11/2011 |
| KR | 1020120078469 | 7/2012 |

OTHER PUBLICATIONS

English Abstract of CN 101664676 A, China, Mar. 10, 2010, 4 pages.*
T. Fujigaya, et al.: "Soluble Carbon Nanotubes and Nanotube-Polymer Composites", American Scientific Publishers, Journal of Nanoscience and Nanotechnology, vol. 12, 2012, pp. 1717-1738.
T. Fujigaya, et al.: "Methodology for Homogeneous Dispersion of Single-walled Carbon Nanotubes by Physical Modification", The Society of Polymer Science, Japan, Polymer Journal, Vo. 40, No. 7, 2008, pp. 577-589.
M. Kitao, et al.: "Study of polymer dispersant for carbon particles in organic polymer matrix", Polymer Preprints, Japan, vol. 60, No. 2, 2011.
T. Majima, et al.: "Dispersion control of carbon nanotube by surface modification and properties of composites", Polymer Preprints, Japan, vol. 61, No. 1, 2012.

(Continued)

*Primary Examiner* — Tae H Yoon
(74) *Attorney, Agent, or Firm* — Dentons US LLP

(57) ABSTRACT

Disclosed are a resin composition and a molded product obtained using the same. By using the resin composition according to the present invention, a molded product having excellent tensile strength, tensile modulus, electromagnetic shielding effects, anti-static effects, and the like may be provided.

5 Claims, 1 Drawing Sheet

(56) References Cited

OTHER PUBLICATIONS

T. Morishita: "Noncovalent functionalization of carbon nanotubes with novel dispersants applicable to polymer-based composites", 19th Polymer Material Forum, 2010, pp. 129-130.
Y. Tomonari, et al.: "Solubilization of Single-Walled Carbon Nanotubes by using Polycyclic Aromatic Ammonium Amphiphiles in Water-Strategy for the Design of High-Performance Solubilizers", Chem. Eur. Journal, 2006, pp. 4027-4034.

* cited by examiner

CARBON NANOMATERIAL-CONTAINING RESIN COMPOSITION AND MOLDED PLASTIC PRODUCT

This application is a National Stage Entry of International Application No. PCT/KR2014/008020, filed Aug. 28, 2014, and claims the benefit of Korean Application No. 10-2013-0104595, filed Sep. 2, 2013, all of which are hereby incorporated by reference in their entirety for all purposes as if fully set forth herein.

TECHNICAL FIELD

The present invention relates to a carbon nanomaterial-containing resin composition and a molded plastic product produced therefrom. More particularly, the present invention relates to a carbon nanomaterial-containing resin composition having excellent tensile strength, tensile modulus, electromagnetic shielding effects, anti-static effects, and the like, and a method of preparing the same, and a molded plastic product produced therefrom.

BACKGROUND ART

Carbon nanomaterials may be applied to a variety of fields such as electronic devices, sensors, high-performance composites, and the like due to excellent mechanical properties, electrical selectivity and field emission characteristics thereof.

In particular, since carbon nanomaterials of nanocomposites have nano-size particles, mechanical performance and electrical performance such as strength, wear resistance, or the like may be considerably improved using a small amount of the carbon nanomaterials without any property loss, when the carbon nanomaterials are well dispersed in a polymer matrix.

However, in spite of predicted superior properties of the carbon nanomaterials, mechanical performance or electrical performance of presently prepared carbon nanomaterial composites falls very short of expectations. Such a phenomenon is caused by two elements, namely, dispersion of carbon nanomaterials and compatibility, adhesion, or wetting of nanotubes and polymers.

Carbon nanomaterials have strong electrostatic attraction and thus it is difficult to uniformly disperse the nanomaterials in a polymer matrix. Recently, as a method to effectively disperse the carbon nanomaterials, a method of treating the nanomaterials with ultrasonic waves and the like have been developed and broadly used. However, the carbon nanomaterials are damaged according to intensity of ultrasonic waves and time and thus it is difficult to maintain superior properties and characteristics thereof, and, accordingly, it is difficult to apply the nanomaterials to large-scale production.

In addition, compatibility of the carbon nanomaterials with broadly used thermoplastic polymers is dramatically low, when compared with surface-treated glass fiber or carbon fiber, which are presently used. This is since a portion of a nanotube surface may not interact with thermoplastic polymers. To resolve such a problem, a surface-treatment method through acid treatment and a method of coating noncovalent bonding materials using n-n interaction have been suggested. However, it is difficult to commercialize the methods due to a complex process procedure and expensive material costs.

DISCLOSURE

Technical Problem

Therefore, the present invention has been made in view of the above problems, and it is one object of the present invention to provide a carbon nanomaterial-containing resin composition which may provide a molded plastic product having excellent tensile strength, tensile modulus, electromagnetic shielding effects, anti-static effects, and the like, and a method of preparing the same.

Technical Solution

In accordance with one aspect of the present invention, provided is a resin composition comprising 80 to 99.9 parts by weight of a thermoplastic resin and 0.1 to 20 parts by weight of polycyclic aromatic hydrocarbon derivative-comprising nanomaterials.

In accordance with another aspect of the present invention, the present invention provides a method of preparing a resin composition, the method comprising a) coating polycyclic aromatic hydrocarbon derivatives on carbon nanomaterials by mixing 1 to 40 parts by weight of carbon nanomaterials, 1 to 40 parts by weight of a polycyclic aromatic hydrocarbon derivative, and 20 to 98 parts by weight of a solvent, based on 100 parts by weight of a thermoplastic resin melt-mixed in step (b) below, with a mechanical mixer; and b) melt-mixing 0.1 to 5 parts by weight of the coated product with 100 parts by weight of the thermoplastic resin.

In accordance with yet another aspect of the present invention, the present invention provides a surface resistance-controlled molded product obtained by molding the resin composition prepared according to the method described above.

Advantageous Effects

As apparent from the fore-going, the present invention advantageously provides a molded product which has excellent tensile strength, tensile modulus, electromagnetic shielding effects, anti-static effects, and the like, using a resin composition according to the present invention.

BEST MODE

Figure 1:
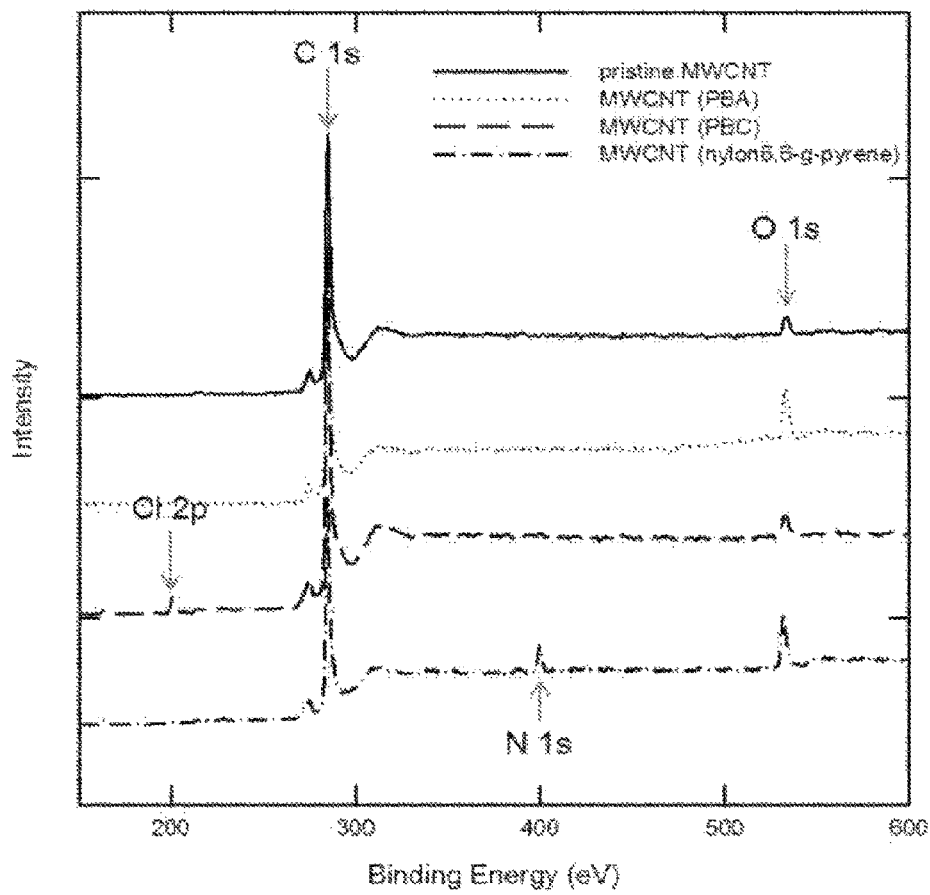
FIG. 1 illustrates graphs for analysis of a combined body having an MWCNT (multi-walled nanotube) and a pyrene derivative combined in π-π interaction☐ prepared according to each of Preparation Examples 1 and 2, through ESCA. When functional groups introduced by combining the MWNT with pyrene derivatives are confirmed through XPS data, the MWNT combined with PBA of FIG. 1 exhibits a higher O 1s peak, when compared with pristine MWNT, the MWNT combined with PBC exhibits a Cl 2p peak, and the polyamide(nylon6,6-g-pyrene) combined with the MWNT only exhibits an N1s peak. Through these data, it can be confirmed that a reactive group is successfully introduced onto a surface of the MWNT through noncovalent bonding.
Figure 2:
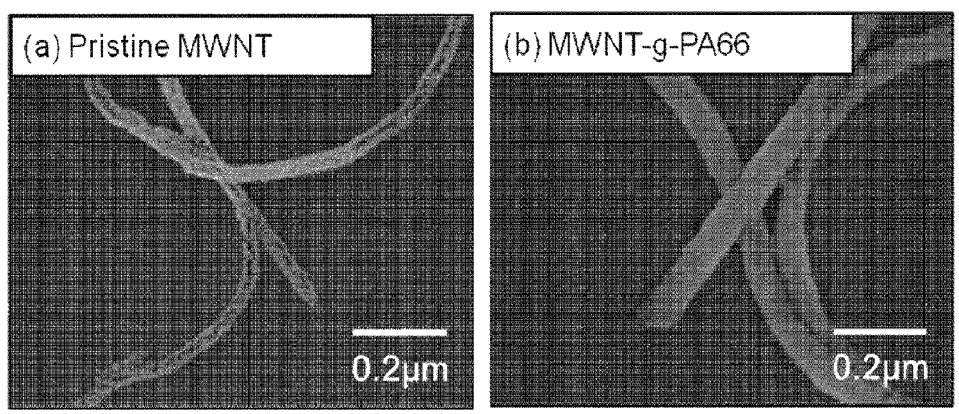
FIG. 2 illustrates SEM images of polyamide (PA66) combined with MWNT, prepared according to Example 2. A raw MWNT material was extruded with polyamide and then dissolved in formic acid. As shown in the figure, polyamide on a surface of the dissolved MWNT is completely removed and thus a thin thread type the same as in the raw material state is observed. However, as shown in the figure, when a surface of the MWNT was combined with polyamide in π-π interaction and then dissolved using formic acid through an extrusion process the same as in a polyamide pellet, it can be confirmed that the surface of the MWNT is coated, a diameter thereof is large, and the surface thereof becomes smooth. Through this, it can be confirmed that polyamide combined with MWNT was realized.

Hereinafter, the present invention will be described in detail.

A resin composition according to the present invention comprises 80 to 99.9 parts by weight of a thermoplastic resin and 0.1 to 20 parts by weight of polycyclic aromatic hydrocarbon derivative-comprising nanomaterials.

When, in the polycyclic aromatic hydrocarbon derivative-comprising carbon nanomaterials, a weight ratio of the carbon nanomaterials to polycyclic aromatic hydrocarbon derivative is within a range of, for example, 1:0.1 to 1:1.5, 1:0.2 to 1:0.9, or 1:0.3 to 1:0.7, excellence in tensile strength, tensile modulus, and electrical conductivity is exhibited.

The polycyclic aromatic hydrocarbon derivative, for example, has 2 to 5, 3 to 5, or 3 to 4 fused benzene rings. Within this range, π-π interaction between the polycyclic aromatic hydrocarbon derivative and the carbon nanomaterials is superior.

In one embodiment, the polycyclic aromatic hydro derivative comprises a functional group which may react with the polymer.

The functional group, for example, may be at least one selected from the group consisting of trialkyl azanium groups, carboxylic acid groups, and acylchloride groups.

As a specific example, the polycyclic aromatic hydrocarbon derivative may be at least one selected from the group consisting of 1-pyrene-butyrylcholine (PBC), 1-pyrene-butyric acid (PBA), and a pyrene derivative.

The carbon nanomaterial, for example, may be at least one selected from the group consisting of nanotube, graphene, and nano fibers.

The thermoplastic resin, for example, may be at least one selected from the group consisting of amide-based polymers, ester-based polymers, acrylate-based polymers, polyketone-based polymers, vinyl-based polymers, styrene-based polymers, polyolefins and polyphenylene ethers.

The amide-based polymers, for example, may be at least one selected from the group consisting of polyamide, polyimide, and polyether ester amide. As a specific example, the polyamide may be at least one selected from the group consisting of nylon 4.6, nylon 6, nylon 6.6, nylon 6.10, nylon 7, nylon 8, nylon 9, nylon 11, nylon 12, nylon 46, MXD 6, amorphous polyamide, and copolymerized polyamide. In addition, the copolymerized polyamide, for example, is a copolymer polymerized comprising two or more polyamide monomers of the other polyamides.

The ester-based polymers, for example, may be at least one selected from the group consisting of polyate, polyester, polybutylene terephthalate, polyethylene terephthalate, poly(ester)urethane and polyether ester.

The acrylate-based polymers, for example, may be polyacrylate, polymethyl methacrylate, or a mixture thereof.

The polyketone-based polymer, for example, may be polyaryletherketone, polyetheretherketone, or a mixture thereof.

The vinyl-based polymers, for example, may be polyvinyl chloride, polyvinylidene fluoride, or a mixture thereof.

The styrene-based polymers, for example, may be at least one selected from the group consisting of polystyrene, styrene-butadiene-styrene copolymer, styrene-isoprene-styrene copolymer, styrene-ethylene-butadiene-styrene copolymer, and styrene-butadiene copolymer.

The composition according to the present invention may further comprise 0.1 to 50 parts by weight of a reinforcement material having a fiber shape.

The reinforcement material of the fiber shape, for example, may be at least one selected from the group consisting of fibers and glass fibers.

In addition, the composition may further comprise an agent for applying striking energy. The agent for applying striking energy, for example, may be at least one selected from the group consisting of zirconia balls and polymer pellets.

The method of preparing the thermoplastic resin combined with carbon nanomaterials according to the present invention comprises a) coating a polycyclic aromatic hydrocarbon derivative on carbon nanomaterials by stirring 1 to 40 parts by weight of carbon nanomaterials, 1 to 40 parts by weight of a polycyclic aromatic hydrocarbon derivative, and 20 to 98 parts by weight of a solvent, based on 100 parts by weight of a thermoplastic resin to melt-mix in step (b) below, and b) melt-mixing 0.1 to 20 parts by weight of the coated product with 80 to 99.9 parts by weight of the thermoplastic resin.

In particular, in step (a), the pyrene derivative may be coated on carbon nanomaterials by stirring 1 to 40 parts by weight of the carbon nanomaterials, 0.1 to 40 parts by weight of the polycyclic aromatic hydrocarbon derivative, and 20 to 98 parts by weight of a solvent, based on 100 parts by weight of a thermoplastic resin to melt-mix in step (b) below, with a mechanical mixer.

In step (a), the fiber shaped-reinforcement material described above may be further comprised in an amount of 0.1 to 50 parts by weight based on 100 parts by weight of the thermoplastic resin.

In addition, in step (a), at least one agent for applying striking energy selected from the group consisting of zirconia balls and polymer pellets may be further comprised. A specific amount thereof, for example, may be within a range of 0.1 to 400 parts by weight based on 100 parts by weight of the thermoplastic resin.

The solvent, for example, may be at least one selected from the group consisting of water, ethanol, methanol, tetrahydrofuran (THF), chloroform, toluene, and benzene.

The solvent, for example, may be used within an amount range of 0.1 to 30 wt % or 0.1 to 20 wt %.

In addition, a weight ratio of the carbon nanomaterials to the solvent, for example, may be 1:0.1 to 1:10, 1:0.5 to 1:8, or 1:2 to 1:5.

The present invention may provide a surface resistance-controlled molded product obtained by molding the resin composition prepared according to the method of the present invention.

The molding may be carried out using general molding methods. The molding, for example, may be carried out in at least one manner selected from extrusion molding and injection molding.

In addition, the molded product may be a molded plastic product which is applied to, for example, products for electromagnetic wave shielding, electrostatic dispersion, and static prevention.

The thermoplastic polymer combined with the carbon nanomaterials according to the present invention is prepared in accordance with the method of preparing the thermoplastic polymer combined with the carbon nanomaterials according to the present invention.

Now, the present invention will be described in more detail with reference to the following examples. These examples are provided only for illustration of the present invention and should not be construed as limiting the scope and spirit of the present invention.

EXAMPLE

Specifications of each of ingredients and additives used in Examples and Comparative Examples below are as follows:
(A) Polyamide Resin
LUMID GP-1000B available from LG Chemical in Korea was used.
(B) Nanotube
As a multi-walled nanotube (MWCNT) having an average outer diameter of 5 to 30 nm and an average length of 1 to 25 μm, NC-7000 available from Nanocyl was used.

Examples 1 to 2 and Comparative Example 1 to 5

A composition of each ingredient and experimental methods used in Examples and Comparative Examples below are the same as in Table 1. Each ingredient composition of Table 1 below was mixed according to each mixing method and then extruded at 280 with polyamide resin in a twin-screw extruder (L/D=42, Φ=40 mm), resulting in preparation of pellets. The prepared pellets were injected at an injection temperature of 280 in an injection machine, resulting in preparation of specimens.

The prepared specimens were incubated at 23, for 48 hours under a relative humidity of 50% and then properties and electrical conductivity thereof were measured according to American Standard Test Method (ASTM).

Covalent bonds of pyrene derivatives and thermoplastic polymers were confirmed using ESCA (XPS). A combination of the polyamide was confirmed through an $N_{1s}$ peak by a bond of an amine group in the polyamide.

Example 3

A specimen was prepared in the same manner as in Example 1, except that, as a solvent, water was used instead of methanol. Properties and electrical conductivity of the prepared specimen are summarized in Table 2 below.

Specifically, the properties and electrical conductivity were measured according to test methods below. Results are summarized in Table 1 below.

Preparation efficiency: an amount of a sample prepared through treatment per day was measured using each of a general laboratory-scale mechanical mixer (capacity: 4 kg) and ultrasonic wave treatment device (capacity: 500 g).

Tensile strength, tensile modulus: tensile strength and tensile modulus of a specimen having a thickness of 3.2 mm were estimated according to ASTM D638.

Surface specific resistance (Ω/CM): using SRM-100 available from PINION, surface resistance of a specimen was measured according to ASTM D257.

Electromagnetic wave shield (dB): electromagnetic wave shield performance of a 3 mm specimen was measured in a 1 GHz area according to ASTM D4935.

TABLE 1

| | | Examples | | Comparative Examples | | | | |
|---|---|---|---|---|---|---|---|---|
| | | 1 | 2 | 1 | 2 | 3 | 4 | 5 |
| Ingredients | MWNT | ○ | ○ | X | ○ | ○ | ○ | ○ |
| | Pyrene derivatives | PBA | PBC | X | X | Pyrene | PBA | PBA |
| | Solvent (methanol)* | ○ | ○ | ○ | ○ | ○ | Large amount | ○ |
| Mixing methods | Mixers | | | | Mechanical type | | | Ultrasonic waves |
| | Stirring time (h) | 12 | 12 | 12 | 12 | 12 | 12 | 12 |
| Properties | Preparation efficiency (kg/day) | 50 | 50 | 50 | 50 | 50 | 50 | 0.001 |
| | Tensile strength (MPa) | 1898 | 1899 | 1606 | 1686 | 1786 | 1607 | 1890 |
| | Tensile modulus (GPa) | 68 | 75 | 59 | 64 | 58 | 60 | 69 |
| | Surface specific resistance (Ω/cm) | $10^8$ | $10^8$ | $>10^{13}$ | $10^{10}$ | $10^9$ | $10^{10}$ | $10^8$ |
| | Electromagnetic wave shielding (dB) | 8 | 8 | 0 | 4 | 6 | 5 | 8 |

*○: used within an amount range according to the present invention, X: not used, Large amount: used in an amount range exceeding the amount range according to the present invention.

TABLE 2

|  |  | Example 3 |
|---|---|---|
| Ingredient | MWNT | O |
|  | Pyrene derivative | PBA |
|  | Solvent | Water |
| Mixing method | Mixer | Mechanical type |
|  | Stirring time(hr) | 12 |
| Properties | Preparation efficiency (kg/day) | 50 |
|  | Tensile strength (MPa) | 1898 |
|  | Tensile modulus (GPa) | 68 |
|  | Surface specific resistance(Ω/cm) | $10^8$ |
|  | Electromagnetic wave shielding (dB) | 8 |

As shown in Table 1, it can be confirmed that Examples 1 to 3 using the carbon nanomaterials, in which the specific functional group is exposed, according to the present invention exhibit excellent tensile strength, tensile modulus, antistatic effects, and electromagnetic shielding effects, when compared with Comparative Examples 1 to 5 using the carbon nanomaterials in which a specific functional group is not exposed.

In particular, it can be confirmed that the specimen of Example 1 prepared by pressure-injecting after mixing the MWNT with PBA as a pyrene derivative and a solvent, through mechanical mixing exhibits dramatic improvement in preparation efficiency, mechanical strength, and electrical conductivity, when compared with the specimen in which the pyrene derivative was not used (Comparative Example 1), a large amount of solvent was used during mechanical mixing (Comparative Example 4), or an ultrasonic wave-type mixer was used.

In addition, the specimen comprising PBC according to Example 2 exhibits excellence in electrical conductivity and mechanical strength, when compared with the specimen comprising PBA according to Example 1.

In particular, it can be confirmed that the polymers combined with carbon nanomaterials (Examples 1 to 3) according to the present invention exhibit five times or more preparation efficiency than the cases using an ultrasonic wave mixer (Comparative Example 5).

For reference, ultrasonic wave treatment devices have limitation in scale-up thereof, unlike mechanical mixers. In addition, although the capacities of the ultrasonic wave treatment devices are increased, it may be difficult to uniformly stir due to characteristics of ultrasonic waves.

In addition, as Comparative Example 4, when a large amount of solvent is added, carbon nanomaterials agglomerate. Accordingly, it is difficult to induce uniform reaction with a polymer pellet, thereby deteriorating properties. In addition, when ultrasonic waves are used as in Comparative Example 5, lengths of carbon nanomaterials are reduced during an ultrasonic wave treatment process and thus tensile strength may be somewhat decreased.

What is claimed is:

1. A method of preparing a resin composition, the resin composition comprising a thermoplastic resin and a polycyclic aromatic hydrocarbon derivative comprising carbon nanomaterials, the method comprising:
    a) forming the polycyclic aromatic hydrocarbon derivative comprising carbon nanomaterials by coating a polycyclic aromatic hydrocarbon derivative on carbon nanomaterials by stirring 0.1 to 20 parts by weight of carbon nanomaterials, 0.1 to 20 parts by weight of a polycyclic aromatic hydrocarbon derivative, and 60 to 99.8 parts by weight of a solvent, based on 100 parts by weight of the thermoplastic resin, in a mechanical mixer; and
    b) melt mixing 0.1 to 5 parts by weight of the polycyclic aromatic hydrocarbon derivative comprising carbon nanomaterials with 100 parts by weight of the thermoplastic resin,
    wherein the carbon nanomaterials comprise multi-walled carbon nanotubes having an average outer diameter of 5 to 30 nm and an average length of 1 to 25 μm, prior to performing step a), and
    wherein the polycyclic aromatic hydrocarbon derivative comprises a 1-pyrene-butyrylcholine, and
    wherein the solvent is methanol or water.

2. The method according to claim 1, wherein the coating further comprises 0.1 to 50 parts by weight of a fiber-shaped reinforcement material.

3. The method according to claim 1, wherein a weight ratio of the carbon nanomaterial to the polycyclic aromatic hydrocarbon derivative is 1:0.2 to 1:0.9.

4. The method according to claim 1, wherein the at least one agent for applying striking energy is present in the mechanical mixer in an amount of 0.1 to 400 parts by weight, measured relative to 100 parts by weight of the thermoplastic resin.

5. The method of claim 1, wherein the mechanical mixer further comprises at least one of a zirconia ball and a polymer pellet as an agent for applying striking energy during step a).

* * * * *